United States Patent
Williams (10) Patent No.: US 10,749,565 B1
(45) Date of Patent: Aug. 18, 2020

(54) RF FRONT END REDUCTION OF RECEIVER DE-SENSITIVITY

(71) Applicant: T-MOBILE USA, INC., Bellevue, WA (US)

(72) Inventor: Carl Williams, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/399,322

(22) Filed: Apr. 30, 2019

(51) Int. Cl.
*H04B 1/50* (2006.01)
*H04B 1/10* (2006.01)
*H04B 1/04* (2006.01)

(52) U.S. Cl.
CPC .............. *H04B 1/50* (2013.01); *H04B 1/10* (2013.01); *H04B 2001/0416* (2013.01)

(58) Field of Classification Search
CPC ..... H04B 1/50; H04B 1/10; H04B 2001/0416
USPC ........................................................... 455/78
See application file for complete search history.

(56) References Cited

U.S. PATENT DOCUMENTS

| 6,038,248 | A | * | 3/2000 | Rabaeijs | G01S 19/33 375/130 |
|---|---|---|---|---|---|
| 2007/0032976 | A1 | * | 2/2007 | Rzyski | G01R 29/26 702/111 |
| 2011/0085477 | A1 | * | 4/2011 | Schiff | H04B 7/15585 370/279 |
| 2019/0081657 | A1 | * | 3/2019 | Zeng | H04B 1/711 |

* cited by examiner

*Primary Examiner* — Eugene Yun
(74) *Attorney, Agent, or Firm* — Marshall, Gerstein & Borun LLP (57) ABSTRACT

Systems and methods for reducing receiver de-sensitivity caused by coupling between a primary antenna and a diversity antenna. More particularly, the systems and methods reduce receiver de-sensitivity due to harmonic components associated with the signal transmitted by the primary antenna falling within a frequency band at which the diversity antenna is configured to sense signals. The systems and methods include amplifying a first signal to produce a transmission signal for transmission via the primary antenna; receiving, at the diversity antenna, a receive signal; amplifying, via a low noise amplifier, the receive signal to apply a gain to the receive signal; inverting the transmission signal; and adding the inverted transmission signal to the amplified receive signal to produce a corrected receive signal. Accordingly, the harmonic components introduced into the receive signal are canceled out via negative feedback at the radio frequency (RF) front end.

20 Claims, 5 Drawing Sheets

RF FRONT END REDUCTION OF RECEIVER DE-SENSITIVITY

BACKGROUND

Many mobile devices include a both a primary antenna and a diversity antenna to support communications over each antenna, thereby improving the quality of the communications to and from the mobile device. However, if the primary and diversity antennas are located in close proximity to one another, the two antennas couple with one another causing the signals transmitted by one of the antennas with be sensed by the other antenna. Due to this coupling, the communications at the other antenna are degraded (sometimes referred to as de-sensed). Accordingly, mobile device designers tend to physically separate the primary and diversity as much as possible to reduce the coupling between the primary and diversity antennas.

However, as mobile devices have grown smaller while including ever more components, it has become more and more difficult to physically separate the primary and diversity antennas. Thus, while physical separation can somewhat decouple the primary and secondary antennas, additional techniques are needed to mitigate the impact the effects of coupling between the primary and diversity antennas.

Further, many communication systems now involve carrier aggregation (CA) techniques to improve communication throughput. CA can be implemented by either utilizing time-division duplexing (TDD) that segregates the uplink and downlink to different time slots of the same carrier (e.g., frequency) or by utilizing frequency-division duplexing (FDD) where the uplink and downlink signals are communicated simultaneously using different component carriers. Due to the simultaneous nature of FDD communications and the above-described coupling effects, signals transmitted by the primary antenna are sensed at the diversity antenna. Said another way, the signals transmitted by the primary antenna jam the diversity antenna from properly being able to receive other signals. It should be noted that this de-sensing still occurs in TDD systems, albeit to a lesser extent than FDD systems.

Conventional solutions have relied upon filtering techniques that filter out the carrier(s) associated with the primary antenna. However, for some combinations of uplink carriers and downlink carriers, the harmonics associated with the uplink carrier (and/or the intermodulation distortion harmonics associated with the composite CA transmit signal) fall within the frequency band that includes the downlink carriers associated with the diversity antenna. Accordingly, traditional filtering techniques cannot filter out the harmonics associated with the uplink carrier without also filtering out the downlink carrier associated with the diversity antenna.

SUMMARY

In one embodiment, a system for reducing receiver de-sensitivity is provided. The system includes a first communication circuit configured to transmit signals at a first frequency band, the first communication circuit including (i) a power amplifier configured to apply a gain to a first signal to produce a transmission signal, and (ii) a first antenna configured to transmit the transmission signal. The system also includes a second communication circuit configured to receive signals at a second frequency band, the second communication circuit including (i) a second antenna configured to receive a receive signal, wherein the transmission signal is transmitted while the second antenna receives the receive signal, and (ii) a low noise amplifier configured to apply a gain to the receive signal. Additionally, the system includes a feedback circuit operatively connected to the first communication circuit and configured to invert the transmission signal; and an adder operatively connected to the feedback circuit and the second communication circuit, the adder configured to add the inverted transmission signal to the amplified receive signal to produce a corrected receive signal.

In another embodiment, a method for reducing receiver de-sensitivity is provided. The method includes (1) amplifying a first signal to produce a transmission signal for transmission via a first antenna, the first signal including a first component signal carried by a first component carrier within a first frequency band and a second component signal carried by a second component carrier within the first frequency band; (2) receiving, at a second antenna configured to sense signals within a second frequency band, a receive signal, wherein harmonic frequencies associated with the first or second component carriers fall within the second frequency band; (3) amplifying, via a low noise amplifier, the receive signal to apply a gain to the receive signal; (4) inverting the transmission signal; and (5) adding the inverted transmission signal to the amplified receive signal to produce a corrected receive signal.

In yet another embodiment, a system for reducing receiver cross-de-sensitivity is provided. The system includes (1) a first transmission circuit configured to transmit signals at a first frequency band, the transmission circuit including (i) a first power amplifier configured to apply a gain to a first signal to produce a first transmission signal, (ii) a first antenna configured to transmit the first transmission signal and to receive a first receive signal, and (iii) a first duplexer configured to control whether the first antenna transmits the first transmission signal or receives the first receive signal; (2) a second transmission circuit configured to transmit signals at a second frequency band, the second transmission circuit including (i) a second power amplifier configured to apply a gain to a second signal to produce a second transmission signal, (ii) a second antenna configured to transmit the second transmission signal and to receive a second receive signal, and (iii) a second duplexer configured to control whether the second antenna transmits the second transmission signal or receives the second receive signal; and (3) a hybrid receive circuit including (i) a non-linear amplifier configured to apply a gain of approximately one to an aggregate signal comprised of the first transmit signal and the second transmit signal, wherein non-linear characteristics of the non-linear amplifier approximate non-linear characteristics of the first and/or second duplexer, (ii) a phase shifter configured to shift a phase of the output of the non-linear amplifier by 180 degrees to produce an inverted feedback signal, (iii) a first adder configured to add the inverted feedback signal to the first receive signal to produce a first corrected receive signal, and (iv) a second adder configured to add the inverted feedback signal to the second receive signal to produce a second corrected receive signal.

DETAILED DESCRIPTION

Figure 1:
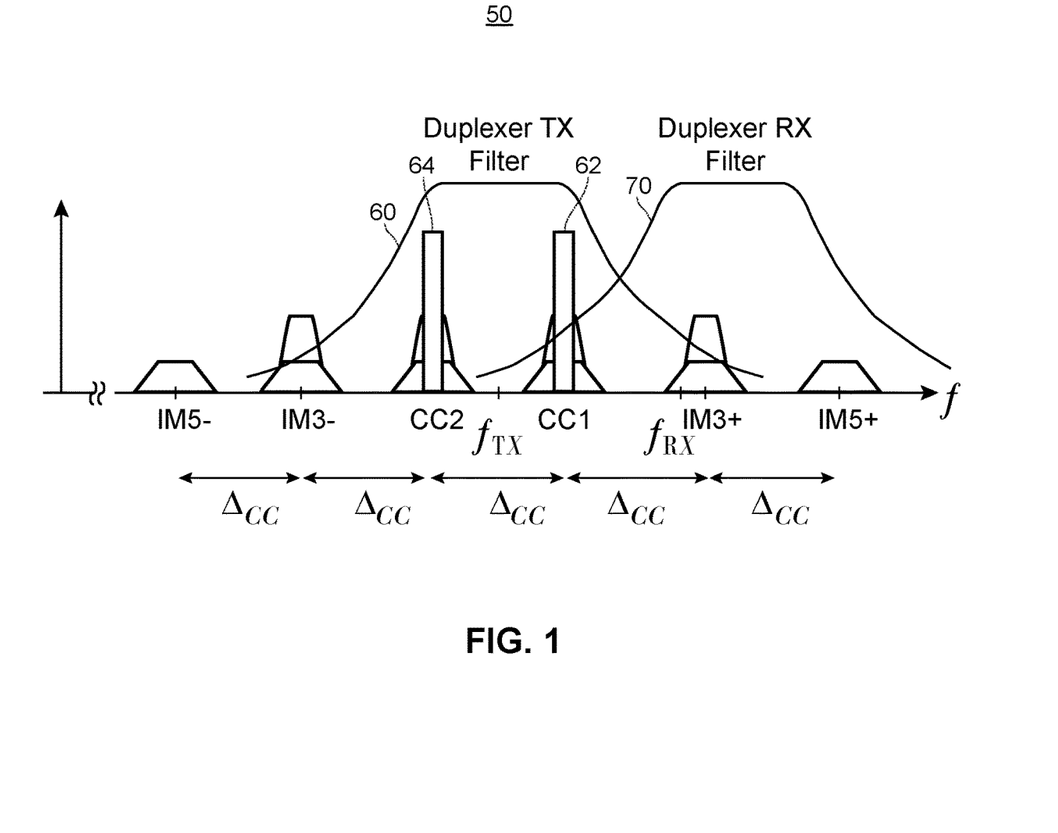
FIG. 1 is a graph depicting an example scenario where a primary antenna causes receiver de-sensitivity at a diversity antenna.

FIG. 1 is a graph 50 depicting an example scenario where a primary antenna causes receiver de-sensitivity at a diversity antenna. As illustrated, the transmit signal includes a first component signal 62 transmitted using a component carrier centered at frequency CC1 and a second component signal 64 transmitted using a second component carrier centered at frequency CC2. Accordingly, the transmission circuit includes a transmit filter (as represented by the curve 60) configured to permit the signals 62 and 64 to pass. It should be appreciated that the signals 62 and 64 are not ideal bars due to the non-linear characteristics associated with various components (such as power amplifiers, diplexers, etc.) of the corresponding transmission circuit.

As described below, the non-linear nature of the components used to produce the signals 62 and 64 cause intermodulation harmonics to manifest in the transmitted signal. More particularly, producing the composite transmission signal that includes signals 62 and 64 causes third order intermodulation harmonics to occur at frequencies IM3− and IM3+ and fifth order intermodulation frequencies to occur at frequencies IM5− and IM5+. However, in the scenario represented by the graph 50, the diversity antenna is configured to sense receive signals in a band that includes frequencies IM3+ and IM5+ at which the third and fifth order intermodulation occur. For example, transmitting a composite transmission signal at band 71 (617 MHz-698 MHz) may cause third order intermodulation harmonics to occur within the PCS band (1850 MHz-1990 MHz). Similarly, transmitting a composite transmission signal at band 17 (704 MHz-716 MHz) may cause third order intermodulation harmonics to occur within band 4 downlink spectrum (2110 MHz-2155 MHz). It should be appreciated that the presently disclosed techniques may be applied to any combination of bands in which the intermodulation harmonics manifest in a frequency range of interest. Accordingly, the conventional approaches that implement a low pass or a band pass filter to filter out the harmonic products, including intermodulation harmonics, cannot be applied without also filtering the intended receive signal.

Figure 2:
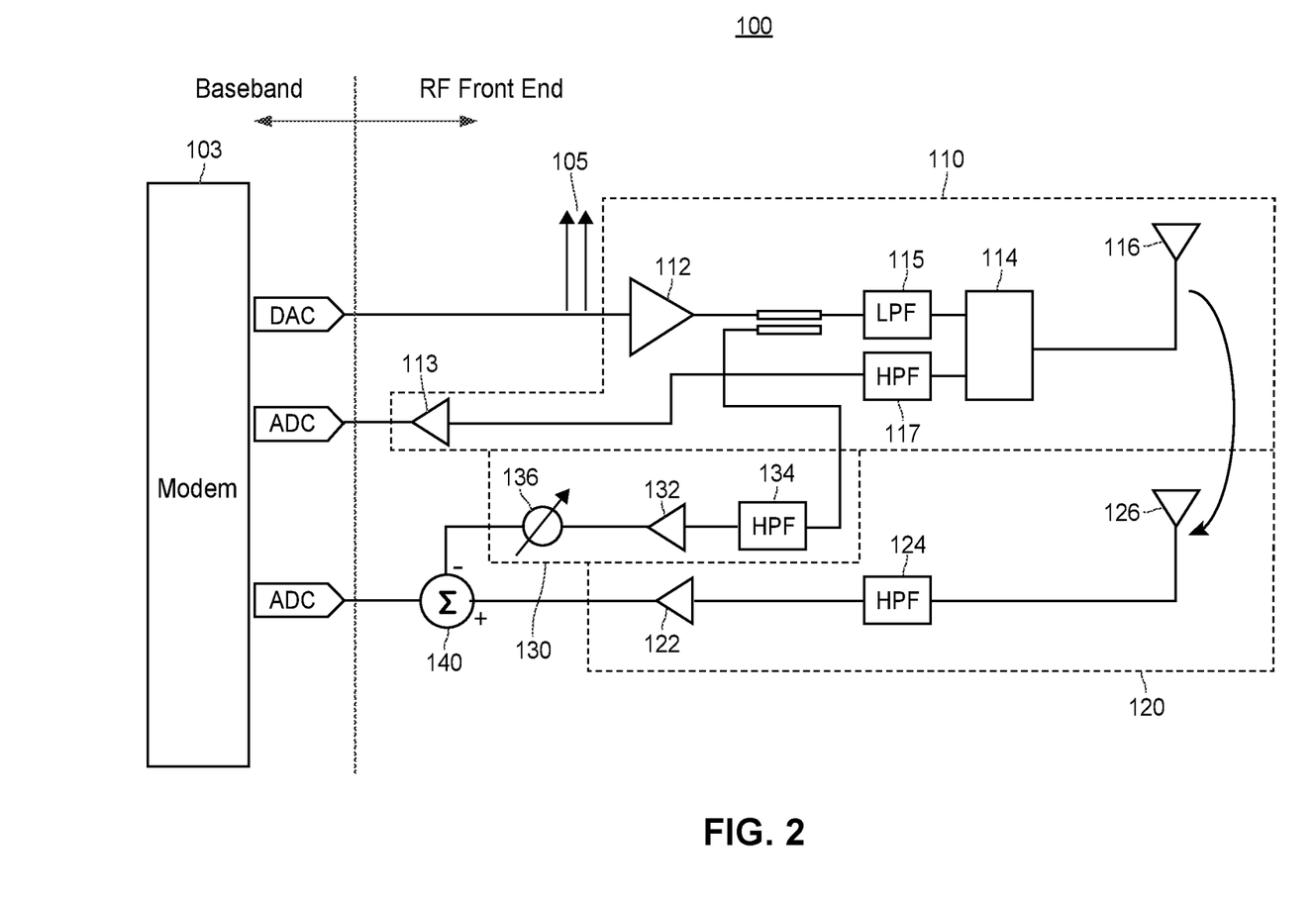
FIG. 2 depicts an example circuit diagram for reducing the de-sensitivity of the diversity antenna caused by the primary antenna.

FIG. 2 depicts a circuit diagram for an example circuit 100 configured to reduce de-sensitivity of a diversity antenna 126 caused by a primary antenna 116. In the example circuit 100, the diversity antenna 126 is utilized in a receive only mode. In most communication systems, the carrier frequencies that support the uplink communications via the circuit 100 are lower frequency carriers than the carrier frequencies that support the downlink communications at the circuit 100. The example circuit 100 may be implemented within user equipment (UE), such as mobile phones, tablets, smart watches, laptops, mobile access points, internet of things (IoT) devices, and/or any other computing devices that support inter-band carrier aggregation techniques. In particular, the circuit 100 may be implemented in UEs configured to implement inter-band carrier aggregation wherein the band utilized for the uplink carriers include harmonic products that manifest in the frequency band that includes the downlink carriers.

As illustrated, the example circuit 100 is a radio frequency (RF) front end circuit communicatively coupled to a modem 103 configured to convert analog signal received via the RF front end for processing by one or more baseband components. Similarly, the modem 103 is configured to convert digital signals generated by the one or more baseband components to analog signals for transmission by the RF front end. For example, the modem 103 may be configured to produce a signal 105 for transmission by the RF front end. For ease of explanation, the signal 105 is illustrated as a dual tone signal with each tone representing a different carrier. It should be appreciated that in many implementations, the signal 105 may be encoded in accordance with any known modulation scheme, such as QPSK or QAM, and any associated bandwidth, such as 1.4 MHz, 3 MHz, 5 Hz, 10 MHz, 15 MHz, 20 MHz, and so on, up to the maximum bandwidth per carrier permitted by the implemented communication protocol. In some embodiments, the signals carried by the component carriers are encoded in accordance with different communication protocols. For example, the signal carried by a first carrier may be encoded in accordance with a Long Term Evolution (LTE) protocol and the signal carried by a second carrier may be encoded in accordance with a New Radio (NR)/5G protocol. In these embodiments, the carrier aggregation technique may be referred to as dual connectivity.

The example circuit 100 includes four main components: a first communication circuit 110 configured to transmit a transmission signal via the primary antenna 116, a second communication circuit 120 configured to sense signals at the diversity antenna 126, a feedback circuit 130 configured to invert the signal 105; and an adder 140 configured to add the output of the feedback circuit 130 to the output of the second communication circuit 120.

Starting with the first communication circuit 110, the signal 105 passes through power amplifier 112 configured to apply a gain to the signal 105 to produce a transmission signal. In the example circuit 100, the power amplifier 112 is configured to apply the gain to all of the uplink carriers. The particular gain applied to the signal 105 may vary depending on the network conditions and/or how much transmit power is needed for a base station (such as an evolved node B (eNB) or a next generation node B (gNB)) to detect the signal produced by the primary antenna 116.

Figure 3A:
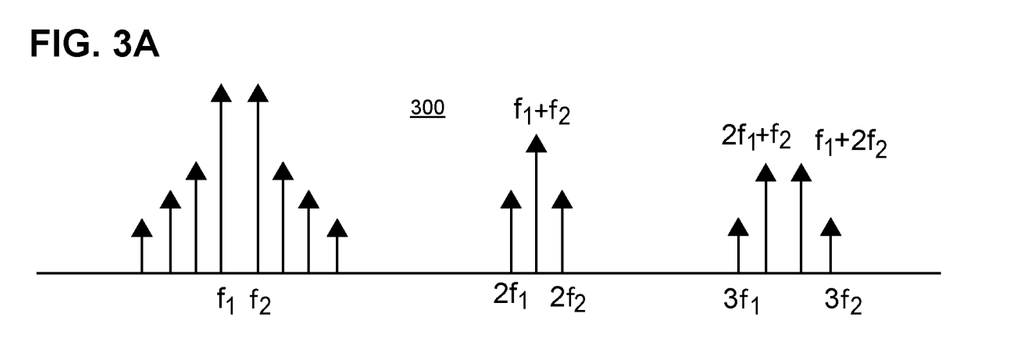
FIGS. 3A-D depict example signals at various locations of the example circuit of FIG. 2.

It should be appreciated that the power amplifier 112 is not an ideal linear amplifier. Accordingly, the non-linear nature of the power amplifier 112 introduces intermodulation harmonics into the signal 105. With simultaneous reference to FIG. 3A, illustrated is an example graph depicting the resulting transmission signal 300 produced by the power amplifier 112. The transmission signal 300 still includes the two tones at each of the carrier frequencies $f_1$ and $f_2$. However, the intermodulation harmonics also produce first order harmonics centered about the carrier frequencies $f_1$ and $f_2$. Additionally, second and third order intermodulation harmonics are present in the transmission signal 300 at frequencies $2f_1$ and $2f_2$ and frequencies $3f_1$ and $3f_2$, respectively. For ease of illustration, the higher order harmonics and the paired lower frequency harmonics are not depicted in FIG. 3A.

As illustrated, the first communication circuit 110 routes the output of the power amplifier 112 (e.g., the transmission signal 300) through a low pass filter 115 configured to filter out the higher frequency downlink carriers. The output of the low pass filter 115 is routed to a duplexer (or switch) 114 configured to control whether the primary antenna 116 operates in a transmit mode or a receive mode. When the primary antenna 116 operates in the transmit mode, the primary antenna 116 is configured to transmit the filtered transmission signal 300. Conversely, when the primary antenna 116 operates in the receive mode, the received signal is routed to a high pass filter 117 configured to filter out the lower frequency uplink carriers and then to a low noise amplifier 113 configured to apply a gain to the received signal for improved processing by the modem 103 and/or the baseband components associated therewith.

As described herein, due to the coupling between the primary antenna 116 and the secondary antenna 126, the filtered transmission signal 300 is sensed at the diversity antenna 126. The received signal (i.e., the signal carried by the higher frequency downlink carriers and the sensed transmission signal 300) is routed to a high pass filter 124 configured to filter out the lower frequency uplink carriers. The output of the filter 124 is then routed to a low noise amplifier 122 to increase the gain of the received signal for improved processing at baseband.

Figure 3B:
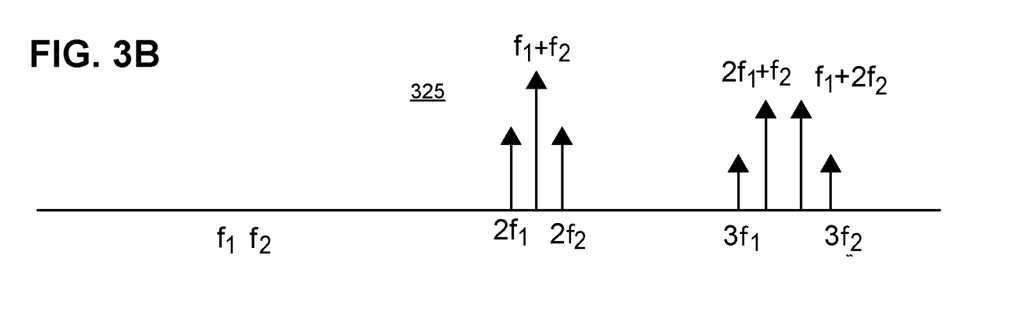

With simultaneous reference to FIG. 3B, illustrated is an example graph depicting a filtered receive signal 325 produced by the filter 124. For ease of explanation, the filtered receive signal 325 only includes the intermodulation harmonics and not the intended receive signal. Because the filter 124 is configured to filter out the uplink carrier frequencies, the portion of the transmission signal 300 centered at carrier frequencies $f_1$ and $f_2$ has been properly filtered. However, because the frequencies $2f_1$ and $2f_2$ and/or the frequencies $3f_1$ and $3f_2$ fall within the frequency band that includes the downlink carriers, the intermodulation harmonics are still present in the filtered receive signal 325. As a result, the signal to noise ratio for the downlink carriers is reduced, degrading downlink connectivity at the UE.

While traditional solutions may attempt to correct for these intermodulation harmonics at the baseband, doing so requires prior knowledge of the particular uplink and downlink carriers that are utilized for the communications. Based on this knowledge, modifications may be made to the baseband signals to reduce the impact of these harmonics. However, many communication systems dynamically shift the particular carriers utilized in uplink and downlink communications. Thus, these baseband techniques need to be constantly adjusted, slowing down the UE's ability to adapt to varying network conditions. Instead, the techniques disclosed herein filter out the intermodulation harmonics at the RF front end. By utilizing the disclosed techniques, the intermodulation harmonics can be filtered from the receive signal 325 without retuning baseband components, regardless of the particular frequencies utilized for the uplink and downlink carriers.

To implement the RF front end filtering techniques, the example circuit 100 includes the feedback circuit 130 configured to invert the signal transmitted over the primary antenna 116 to cancel out the corresponding signal sensed at the diversity antenna 126 due to the aforementioned coupling therebetween. As described above, the signal sensed at the diversity antenna 126 is not routed directly to the modem 103, but passed through the high pass filer 124 configured to filter out the lower frequency uplink carriers and the low noise amplifier 122 to apply a gain to the received signals for improved baseband processing. Accordingly, the feedback circuit 130 is configured to account for these components when inverting the transmission signal 300.

The example feedback circuit 130 includes a high pass filter 134 configured to filter out the lower frequency uplink carriers. Consequently, the output of the filter 134 is similar to the receive signal 325. Additionally, the feedback circuit includes an amplifier 132. It should be appreciated that the amplifier 122 is not an ideal amplifier and includes non-linear characteristics. Accordingly, the amplifier 132 is configured to subject the output of the filter 134 to similar non-linear characteristics as those introduced into the receive signal 325 by the low noise amplifier 122. In some embodiments, because the signal carried by the feedback circuit 130 has not been subjected to free space attenuation, the amplifier 132 is configured to apply a gain of one (i.e., the amplifier is not configured to actually amplify the signal). In these embodiments, the amplifier 132 is configured to modify the feedback signal to approximate the non-linear characteristics of the amplifier 122 without adjusting the power level of the feedback signal.

Figure 3C:
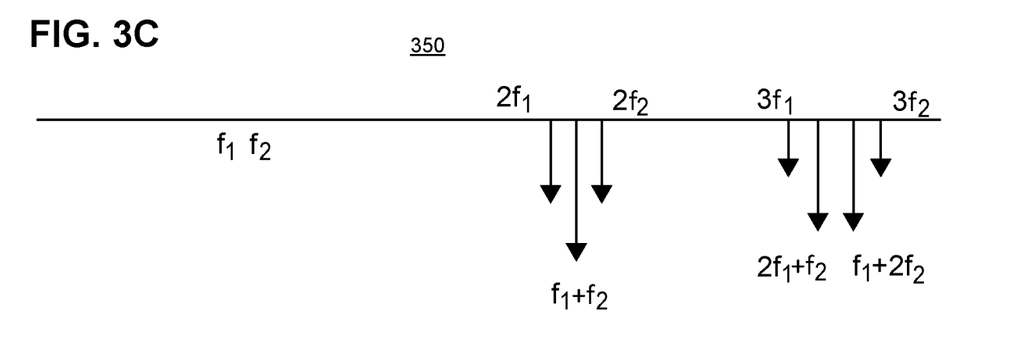

Additionally, the feedback circuit 130 includes a phase shifter 136 configured to invert the output of the amplifier 132. More particularly, the phase shifter 136 is configured to shift the phase of the output of the amplifier 132 by 180 degrees. With simultaneous reference to FIG. 3C, illustrated is an example graph depicting a resulting inverted transmission signal 350 produced by the phase shifter 136. As illustrated, the inverted transmission signal 350 includes an inverted version of the second and third order intermodulation products included in the transmission signal 300 and/or the receive signal 325. While the example circuit 100 couples the first communication circuit 110 to the feedback circuit 130 at the output node of the power amplifier 112, in alternate embodiments, the first communication circuit 130 is coupled to the feedback circuit 130 at the output node of the duplexer 114 to account for the non-linear characteristics of the duplexer 114.

The example circuit 100 also includes an adder 140 configured to add the output of the feedback circuit 130 to the output of the second communication circuit 120. For example, the adder 140 may add the inverted transmission signal 350 to the filtered receive signal 325. As a result, the intermodulation harmonic interference introduced by the non-linear components of the first communication circuit are subtracted out of the signal sensed by the diversity antenna 126, thereby improving the signal to noise ration and reducing receiver de-sensitivity. The output of the adder 140 is routed to the modem 103 for baseband processing.

Figure 3D:
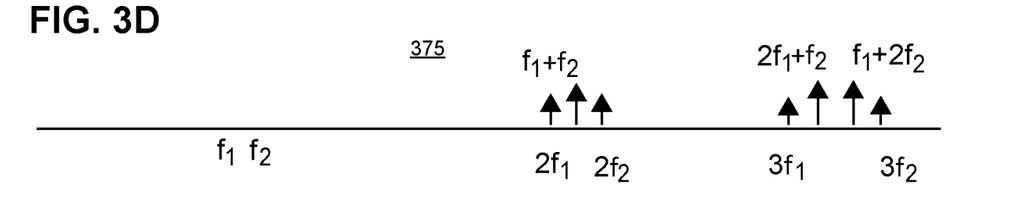

With simultaneous reference to FIG. 3D, illustrated is an example graph depicting a corrected receive signal 375 produced by the adder 140. For ease of explanation, the corrected receive signal 375 only includes the intermodulation harmonics and not the intended receive signal. As illustrated in FIG. 3D, the feedback circuit 130 may not completely cancel out the intermodulation harmonics. For example, the free space attenuation between the primary receiver 116 and the diversity antenna 126 and/or the low noise amplifier 122 may alter the power levels associated with the intermodulation harmonics. Thus, the power level of the intermodulation harmonics in the signal produced by the amplifier 132 may not match the power levels of the intermodulation harmonics in the signal produced by the amplifier 122. Despite these differences, the disclosed techniques are able to mitigate a significant portion of the intermodulation harmonic interference and provide a meaningful improvement to the quality of the signals detected at the diversity antenna 126.

In the example circuit 100, the power amplifier 112 and the low noise amplifier 122 are configured to amplify the aggregate signal comprised of the various component carriers. In alternate embodiments, such as those where dual connectivity is implemented, each uplink carrier may be amplified by respective power amplifiers 112. Similarly, in these embodiments, each downlink carrier may be amplified by respective low noise amplifiers 122. In these embodiments, the feedback circuit 130 may include respective amplifiers 132 configured to subject the output signal to respective non-linear characteristics of the respective low noise amplifiers 122. Accordingly, in these embodiments, the circuit 100 includes respective adders configured to add the inverted output of respective amplifiers 132 to the respective output of the low noise amplifiers 122.

Because the diversity antenna 126 is configured to operate in a receive only mode, there are no transmission signals for the primary antenna 116 to sense. Accordingly, there is no need to reduce intermodulation harmonic interference at the primary antenna 116. That said, the techniques described with respect to the example 100 may be extended to implementations where the diversity antenna is configured to transmit signals, while also maintaining receive diversity.

Figure 4:
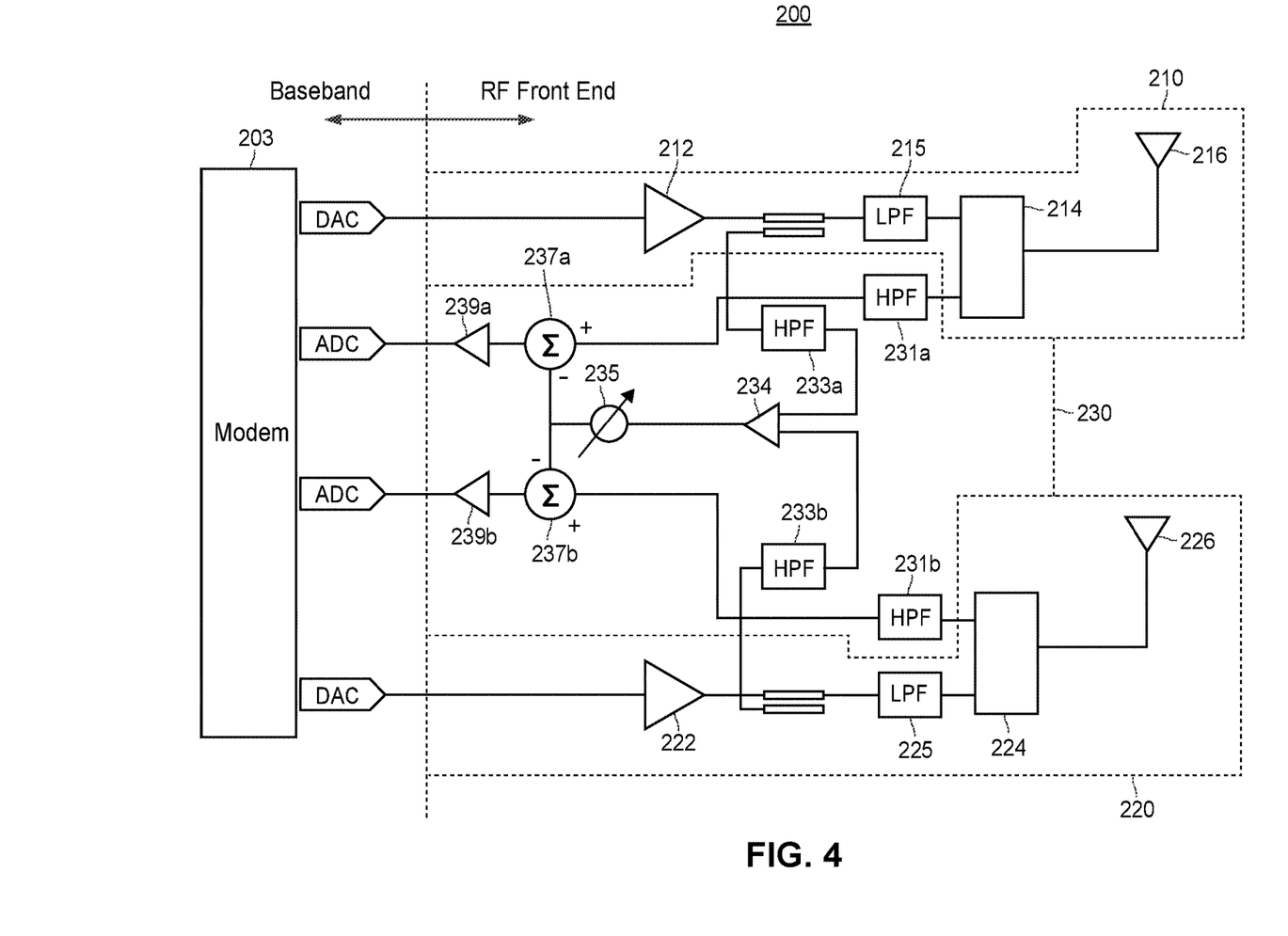
FIG. 4 depicts an example circuit diagram for reducing cross-de-sensitivity when the diversity antenna is adapted to support uplink communications.

Turning now to FIG. 4, illustrated is an example circuit 200 configured to reduce cross-interference between a primary antenna 216 and a diversity antenna 226. The example circuit 200 may be implemented within UEs that support inter-band carrier aggregation techniques. In some embodiments, the primary antenna 216 may be configured to transmit and/or receive signals using carriers within a first frequency band and the diversity antenna 226 may be configured to transmit and/or receive signals using carriers within a second frequency band. According to some aspects, the first frequency band is associated with harmonic frequencies that manifest within the second frequency band, and vice versa. Accordingly, the example circuit 200 is generally configured to reduce the intermodulation harmonics that are sensed by each of the primary antenna 216 and the diversity antenna 226.

As illustrated, the example circuit 200 is a radio frequency (RF) front end circuit communicatively coupled to a modem 203 configured to convert analog signal received via the radio frequency (RF) front end for processing by one or more baseband components. Similarly, the modem 203 is configured to convert digital signals generated by the one or more baseband components to analog signals for transmission by the RF front end. For example, the modem 203 may be configured to produce a first signal for transmission via the primary antenna 216 and a second signal for transmission via the secondary antenna 226. The first and second signals may be encoded in accordance with any known modulation scheme, such as QPSK or QAM, and any associated bandwidth, such as 1.4 MHz, 3 MHz, 5 Hz, 10 MHz, 15 MHz, 20 MHz, and so on, up to the maximum bandwidth per carrier permitted by the implemented communication protocol. In some embodiments, the first signal and the second signal are encoded in accordance with different communication protocols. For example, the first signal may be encoded in accordance with a Long Term Evolution (LTE) protocol and the second signal may be encoded in accordance with a New Radio (NR) protocol.

The example circuit 200 includes three main components: a first transmission circuit 210 configured to transmit signals within the first frequency band via the primary antenna 216, a second transmission circuit 220 configured to transmit signals within the second frequency band via the diversity antenna 226, and a hybrid receive circuit 230 configured to mitigate cross-interference introduced by coupling between the primary antenna 216 and the diversity antenna 226.

Starting with the first transmission circuit 210, the first signal produced by the modem 203 passes through power amplifier 212, which is configured to apply a gain to the first signal to produce a first transmission signal. In the example circuit 200, the power amplifier 212 is configured to apply the gain to all of the uplink carriers in the first frequency band. However, in other embodiments, each uplink carrier may pass through a respective power amplifier 212. The particular gain applied to the first signal (and/or a particular uplink carrier) may vary depending on the network conditions and/or how much transmit power is needed for a base station (such as an evolved node B (eNB) or a next generation node B (gNB)) to detect the signal produced by the primary antenna 216. As described herein, the power amplifier 212 is not an ideal linear amplifier, causing intermodulation harmonics to appear within the first transmission signal.

The first transmission circuit 210 then routes the output of the power amplifier 212 to a low pass filter 215 to filter out the higher frequency downlink carriers within the first frequency band. The output of the low pass filter 215 is routed to a duplexer (or switch) 214 configured to control whether the primary antenna 216 operates in a transmit mode or a receive mode. When the primary antenna 216 operates in the transmit mode, the primary antenna 216 is configured to transmit the filtered first transmission signal. Conversely, when the primary antenna 216 operates in the receive mode, a first receive signal is routed to the hybrid receive circuit 230.

Similarly, the second transmission circuit 220 routes the second signal produced by the modem 203 through power amplifier 222, which is configured to apply a gain to the second signal to produce a second transmission signal. In the example circuit 200, the power amplifier 222 is configured to apply the gain to all of the uplink carriers in the second frequency band. However, in other embodiments, each uplink carrier may pass through a respective power amplifier 222. The particular gain applied to the second signal (and/or a particular uplink carrier) may vary depending on the network conditions and/or how much transmit power is needed for a base station (such as an evolved node B (eNB) or a next generation node B (gNB)) to detect the signal produced by the diversity antenna 226. As described herein, the power amplifier 222 is not an ideal linear amplifier, causing intermodulation harmonics to appear within the second transmission signal.

The second transmission circuit 220 then routes the output of the power amplifier 222 to a low pass filter 225 to filter out the higher frequency downlink carriers within the second frequency band. The output of the low pass filter 225 is routed to a duplexer (or switch) 224 configured to control whether the diversity antenna 226 operates in a transmit mode or a receive mode. When the diversity antenna 226 operates in the transmit mode, the diversity antenna 226 is configured to transmit the filtered second transmission signal. Conversely, when the diversity antenna 226 operates in the receive mode, a second receive signal is routed to the hybrid receive circuit 230.

Turning to the hybrid receive circuit 230, the first and second receive signals are routed through respective high pass filters 231a and 231b configured to filter out the lower frequency uplink carrier frequencies within the first and second frequency bands, respectively. Additionally, the hybrid receive circuit 230 is configured to obtain the first and second transmission signals as feedback signals used to mitigate the impact of the intermodulation harmonic interference. Accordingly, the first transmission signal is routed through a high pass filter 233a configured to filter out the lower frequency uplink carriers within the second frequency band, and the second transmission signal is routed through a high pass filter 233b configured to filter out the lower frequency uplink carriers within the first frequency band.

The outputs from the high pass filters 233a and 233b are aggregated and routed through a non-linear amplifier 234 configured to apply a gain (such as a gain of approximately one) to the aggregated signal. The non-linear amplifier 234 is further configured to subject the aggregated signal to similar non-linear characteristics as those introduced into the transmit and/or receive signals by the duplexers 214 and/or 224 to produce a feedback signal indicative of (i) the intermodulation harmonics introduced into the second receive signal from the first transmit signal being transmitted by the primary antenna 216 and (ii) the intermodulation harmonics introduced into the first receive signal from the second transmit signal being transmitted by the diversity antenna 226. The feedback signal is routed to a phase shifter 235 configured to shift the phase of the output of the non-linear amplifier 234 by 180 degrees to produce an inverted feedback signal. Accordingly, the inverted feedback signal at the output of the phase shifter 235 includes a signal configured to cancel out the intermodulation harmonic signals sensed by the primary antenna 216 and the diversity antenna 226 due to coupling therebetween.

The hybrid receive circuit 230 also includes adders 237a and 237b configured to add the inverted feedback signal to the receive signals. More particularly, the hybrid receive circuit 230 includes an adder 237a configured to add the inverted feedback signal to the filtered first receive signal and an adder 237b configured to add the inverted feedback signal to the filtered second receive signal. The outputs of the adders 237a and 237b are routed to respective low noise amplifiers 239a and 239b configured to amplify the respective outputs for improved processing at baseband by the modem 203. Consequently, the intermodulation harmonics in the output of the low noise amplifier 239a and the intermodulation harmonics in the output of the low noise amplifier 239b are both dampened.

Figure 5:
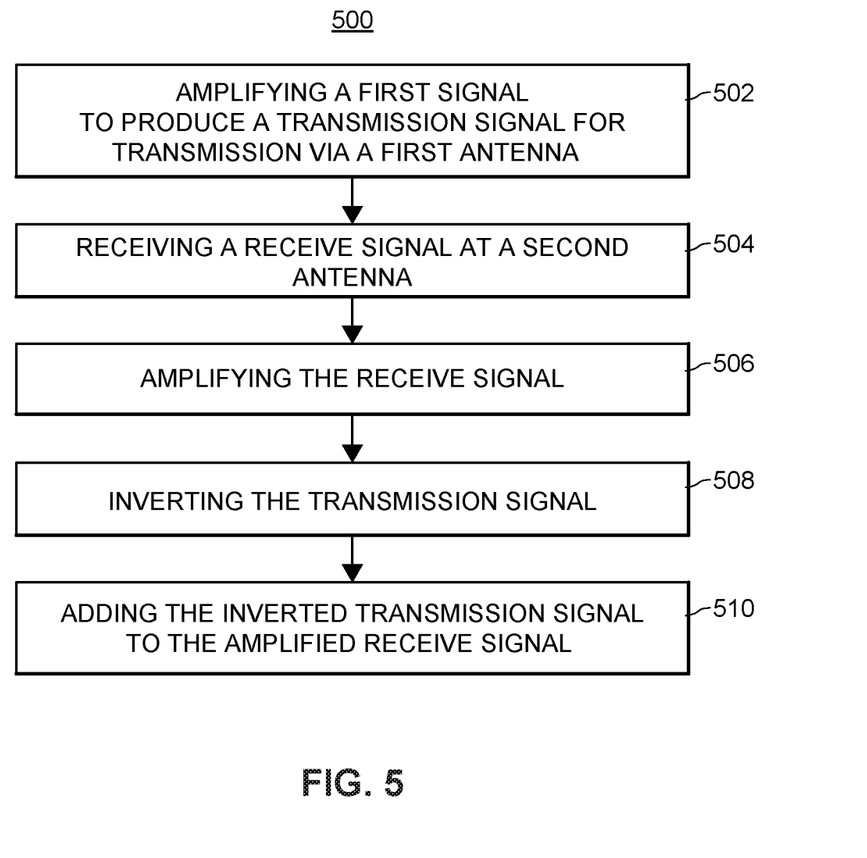
FIG. 5 illustrates an example method in which a circuit of user equipment is configured to reduce receiver de-sensitivity introduced by simultaneous transmission and reception of signals at an radio frequency front end that includes a first antenna and a secondary antenna.

FIG. 5 illustrates an example method 500 in which a circuit (such as the circuit 100) of a UE is configured to reduce receiver de-sensitivity introduced by simultaneous transmission and reception of signals at an RF front end that includes a first antenna and a secondary antenna. More particularly, the method 500 is configured to reduce harmonic interference when the frequency band used to transmit signals via the first antenna is associated with harmonic frequencies within the frequency band used to receive signals at the second antenna.

The method 500 may begin at block 502 when the circuit amplifies a first signal to produce a transmission signal for transmission via the first antenna (e.g., the primary antenna). The first signal may be generated a by a modem (such as the modem 103) using carrier aggregation techniques such that the first signal includes a first component signal carried by a first component carrier and a second component signal carried by a second component carrier, both of which are within the first frequency band. In some embodiments, the modem encodes the first component signal in accordance with a LTE protocol and the second component signal in accordance with a NR protocol.

The circuit may include a power amplifier (such as the power amplifier 112) configured to amplify the first signal. In some embodiments, the circuit includes a single amplifier configured to amplify each of the component carriers within the first signal. In other embodiments, the first component signal is amplified by a first amplifier and the second component signal is amplified by a second amplifier. It should be appreciated that due to the non-linear nature of the amplifier, the transmission signal includes harmonic components located outside of the first frequency band (e.g., within second frequency band).

At block 504, the circuit is configured to receive, at the second antenna (e.g., the diversity antenna), a receive signal. More particularly, the second antenna is configured to sense signals transmitted within the second frequency band. As described above, due to coupling with the primary antenna, the transmission signal is included within the sensed receive signal. Thus, the sensed receive signal includes harmonic components within the spectrum of interest for the receive signal. Thus, while the circuit is configured to filter the receive signal using a high pass filter configured to filter out the uplink carriers, the harmonic components of the transmission signal are still present in the receive signal after the filter is applied.

At block 506, the circuit is configured to amplify, via a low noise amplifier (such as the low noise amplifier 122), the receive signal to apply a gain to the receive signal. In some embodiments, the circuit is configured to amplify the filtered receive signal. In other embodiments, the circuit amplifies the receive signal prior to filtering the receive signal. Additionally, in some embodiments, the circuit includes a single amplifier configured to amplify each of the component carriers within the receive signal. In other embodiments, a first component receive signal is amplified by a first amplifier and the second component receive signal is amplified by a second amplifier.

At block 508, the circuit is configured to invert the transmission signal to produce a negative feedback to cancel out the harmonic components included within the filtered receive signal. Accordingly, inverting the transmission signal may include filtering the lower frequency first and second component uplink carriers within the first frequency band and applying, via a non-linear amplifier (such as the amplifier 132), non-linear characteristics of the low noise amplifier 122 and/or any other non-linear components in the RF front end receive path (such as those included in the second communication circuit 120) to the filtered transmission signal. In some embodiments, the non-linear amplifier applies the non-linear characteristics of the RF front end to each of the component signals of the filtered transmission signal. In other embodiments, a first non-linear amplifier applies non-linear characteristics applied to a first component downlink carrier in the receive path to a first component signal of the filtered transmission signal and a second non-linear amplifier applies non-linear characteristics applied to a second component downlink carrier in the receive path to a second component signal of the filtered transmission signal. Regardless, the circuit is configured to shift the phase of the output of the non-linear amplifier(s) by 180 degrees.

At block 510, the circuit is configured to add the inverted transmission signal to the amplified receive signal to produce a corrected receive signal. Because the inverted transmission signal was subjected to the same non-linear characteristics as the harmonic components of the transmission signal sensed at the second antenna due to coupling, the inverted transmission signal is located at approximately the same frequency as the harmonic components. In embodiments where the individual carriers are amplified separately, the circuit may be configured to add an inverted output of the first non-linear amplifier to the first component receive signal to produce a first corrected receive signal and an inverted output of the second non-linear amplifier to the second component receive signal to produce a second corrected receive signal. The circuit may then route the corrected receive signal(s) to the modem for baseband processing.

It should also be understood that, unless a term is expressly defined in this patent using the sentence "As used herein, the term ' ' is hereby defined to mean . . ." or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and some operations may be performed in an order other than the order illustrated. Structures and components functionality presented as separate components in example configurations may be implemented as a combined structure or component. Similarly, structures and components functionality presented as a single component may be implemented as separate components. These and other variations, modifications, additions, and improvements fall within the scope of the subject matter herein.

For example, other architectures can be used to implement the described functionality, and are intended to be within the scope of this disclosure. To this end, while the present disclosure generally describes the transmit path of the RF front end as utilizing power amplifiers to amplify signals and the receive path of the RF front end as utilizing low noise amplifiers, in some embodiments, alternate types of amplifiers may be implemented in transmit and/or receive paths. As another example, the present disclosure refers to high pass filters and low pass filters; however, in some embodiments, the high pass filters or the low pass filters may be implemented as a bandpass filter. Furthermore, although specific distributions of responsibilities are defined above for purposes of discussion, the various functions and responsibilities might be distributed and divided in different ways, depending on particular circumstances.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A radio frequency (RF) front end circuit for reducing receiver de-sensitivity, the RF front end circuit comprising:
    a first communication circuit configured to transmit signals at a first frequency band, the first communication circuit including:
        a power amplifier configured to apply a gain to a first signal to produce a transmission signal, and
        a first antenna configured to transmit the transmission signal;
    a second communication circuit configured to receive signals at a second frequency band, the second communication circuit including:
        a second antenna configured to receive a receive signal, wherein the transmission signal is transmitted while the second antenna receives the receive signal, and
        a low noise amplifier configured to apply a gain to the receive signal;
    a feedback circuit operatively connected to the first communication circuit and configured to invert the transmission signal; and
    an adder operatively connected to the feedback circuit and the second communication circuit, the adder configured to add the inverted transmission signal to the amplified receive signal to produce a corrected receive signal.

2. The RF front end circuit of claim 1, wherein the transmission signal is transmitted using two or more component carriers located within the first frequency band and includes one or more harmonic signals located at one or more respective harmonic frequencies outside of the first frequency band.

3. The system of RF front end circuit 2, wherein the feedback circuit includes:
    a filter configured to filter out the component carriers of the transmission signal while permitting the one or more respective harmonic frequencies;
    an amplifier configured to apply a gain of approximately one to an output of the filter, wherein non-linear characteristics of the amplifier are about the same as non-linear characteristics of the low noise amplifier; and
    a phase shifter configured to shift a phase of output of the amplifier by 180 degrees.

4. The RF front end circuit of claim 2, wherein the second communication circuit includes:
    a filter configured to filter out the component carriers of the transmission signal from the receive signal.

5. The RF front end circuit of claim 2, wherein the first signal includes a first component signal carried by a first component carrier of the two or more component carriers and a second component signal carried by a second component carrier of the two or more component carriers.

6. The RF front end circuit of claim 5, wherein the first component signal is encoded in accordance with a first communication protocol and the second component signal is encoded in accordance with a second communication protocol.

7. The RF front end circuit of claim 6, wherein in the first communication protocol is a Long Term Evolution (LTE) protocol and the second communication protocol is a New Radio (NR) protocol.

8. The RF front end circuit of claim 5, wherein the first component signal and the second component signal includes harmonic frequencies located in the second frequency band.

9. The RF front end circuit of claim 5, wherein:
the power amplifier is a first power amplifier configured to amplify the first component signal to produce a first transmission signal; and
the first communication circuit includes:
a second power amplifier configured to amplify the second component signal to produce a second transmission signal, and
an adder configured to combine the first transmission signal and the second transmission signal to produce the transmission signal.

10. The RF front end circuit of claim 5, wherein:
the receive signal is received using two or more component carriers located within the second frequency band;
the low noise amplifier is a first low noise amplifier configured to apply a gain to a first component carrier of the two or more component carriers within the second frequency band;
the second communication circuit includes a second low noise amplifier configured to apply a gain to a second component carrier of the two or more component carriers within the second frequency band; and
the feedback circuit includes:
a first amplifier configured to apply a gain of approximately one to a portion of the transmission signal located at the first component carrier of the two or more component carriers within the second frequency band, wherein non-linear characteristics of the first amplifier are about the same as non-linear characteristics of the first low noise amplifier; and
a second amplifier configured to apply a gain of approximately one to a portion of the transmission signal located at the second component carrier of the two or more component carriers within the second frequency band, wherein non-linear characteristics of the second amplifier are about the same as non-linear characteristics of the second low noise amplifier.

11. The system of claim 10, wherein:
the adder is a first adder configured to add an inverted output of the first amplifier to an output of the first low noise amplifier to produce a first corrected receive signal; and
the system includes a second adder configured to add an inverted output of the second amplifier to an output of the second low noise amplifier to produce a second corrected receive signal.

12. A method implemented at a radio frequency (RF) front end circuit for reducing receiver de-sensitivity, the method comprising:
amplifying a first signal to produce a transmission signal for transmission via a first antenna, the first signal including a first component signal carried by a first component carrier within a first frequency band and a second component signal carried by a second component carrier within the first frequency band;
receiving, at a second antenna configured to sense signals within a second frequency band, a receive signal, wherein harmonic frequencies associated with the first or second component carriers fall within the second frequency band;
amplifying, via a low noise amplifier, the receive signal to apply a gain to the receive signal;
inverting the transmission signal; and
adding the inverted transmission signal to the amplified receive signal to produce a corrected receive signal.

13. The method of claim 12, wherein inverting the transmission signal comprises:
filtering the first and second component carriers within the first frequency band;
applying, via a non-linear amplifier, non-linear characteristics of the low noise amplifier to the filtered transmission signal; and
shifting, via a phase shifter, a phase of an output of the non-linear amplifier by 180 degrees.

14. The method of claim 12, wherein the first component signal is encoded in accordance with a Long Term Evolution (LTE) protocol and the second component signal is encoded in accordance with a New Radio (NR) protocol.

15. The method of claim 12, wherein amplifying the first signal comprises:
amplifying, via a first power amplifier, the first component signal to produce a first transmission signal; and
amplifying, via a second power amplifier, the second component signal to produce a second transmission signal.

16. The method of claim 12, wherein:
the receive signal is received using two or more component carriers located within the second frequency band;
the low noise amplifier is a first low noise amplifier; and
amplifying the receive signal comprises:
amplifying, via the first low noise amplifier, a first component carrier of the two or more component carriers of the receive signal to produce a first component receive signal; and
amplifying, via a second low noise amplifier, a second component carrier of the two or more component carriers of the receive signal to produce a second component receive signal.

17. The method of claim 16, wherein:
the non-linear amplifier is a first non-linear amplifier; and
inverting the transmission signal comprises:
applying, via the first non-linear amplifier, non-linear characteristics of the first low noise amplifier to a portion of the transmission signal located at the first component carrier of the two or more component carriers within the second frequency band; and
applying, via a second non-linear amplifier, non-linear characteristics of the second low noise amplifier to a portion of the transmission signal located at the second component carrier of the two or more component carriers within the second frequency band.

18. The method of claim 17, wherein adding the inverted transmission signal to the receive signal comprises:
adding an inverted output of the first non-linear amplifier to the first component receive signal to produce a first corrected receive signal; and
adding an inverted output of the second non-linear amplifier to the second component receive signal to produce a second corrected receive signal.

19. A radio frequency (RF) front end circuit for reducing receiver cross-de-sensitivity, the RF front end circuit comprising:
a first transmission circuit configured to transmit signals at a first frequency band, the first transmission circuit including:
a first power amplifier configured to apply a gain to a first signal to produce a first transmission signal,
a first antenna configured to transmit the first transmission signal and to receive a first receive signal, and a first duplexer configured to control whether the first antenna transmits the first transmission signal or receives the first receive signal;

a second transmission circuit configured to transmit signals at a second frequency band, the second transmission circuit including:
- a second power amplifier configured to apply a gain to a second signal to produce a second transmission signal,
- a second antenna configured to transmit the second transmission signal and to receive a second receive signal, and
- a second duplexer configured to control whether the second antenna transmits the second transmission signal or receives the second receive signal; and a hybrid receive circuit including:
- a non-linear amplifier configured to apply a gain of approximately one to an aggregate signal comprised of the first transmit signal and the second transmit signal, wherein non-linear characteristics of the non-linear amplifier approximate non-linear characteristics of the first and/or second duplexer,
- a phase shifter configured to shift a phase of an output of the non-linear amplifier by 180 degrees to produce an inverted feedback signal,
- a first adder configured to add the inverted feedback signal to the first receive signal to produce a first corrected receive signal, and
- a second adder configured to add the inverted feedback signal to the second receive signal to produce a second corrected receive signal.

20. The RF front end circuit of claim 19, wherein the first signal is encoded in accordance with a Long Term Evolution (LTE) protocol and the second signal is encoded in accordance with a New Radio (NR) protocol.

\* \* \* \* \*

UNITED STATES PATENT AND TRADEMARK OFFICE
CERTIFICATE OF CORRECTION

PATENT NO. : 10,749,565 B1
APPLICATION NO. : 16/399322
DATED : August 18, 2020
INVENTOR(S) : Carl Williams Page 1 of 1

It is certified that error appears in the above-identified patent and that said Letters Patent is hereby corrected as shown below:

In the Claims

At Column 12, Line 38, "system of RF front end circuit 2," should be -- RF front end circuit of claim 2, --.

At Column 13, Line 42, "system" should be -- RF front end circuit --.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*